United States Patent Office.

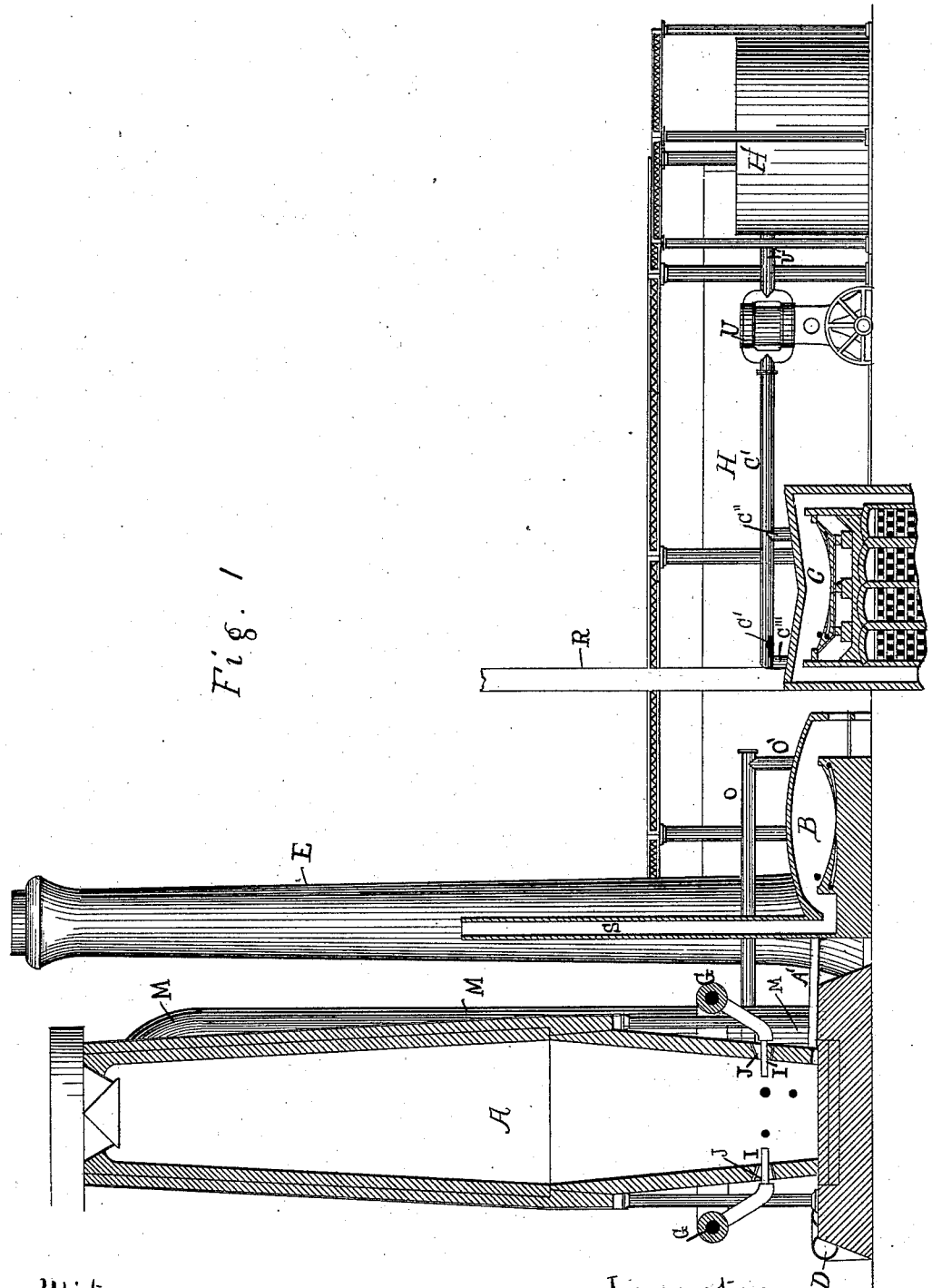

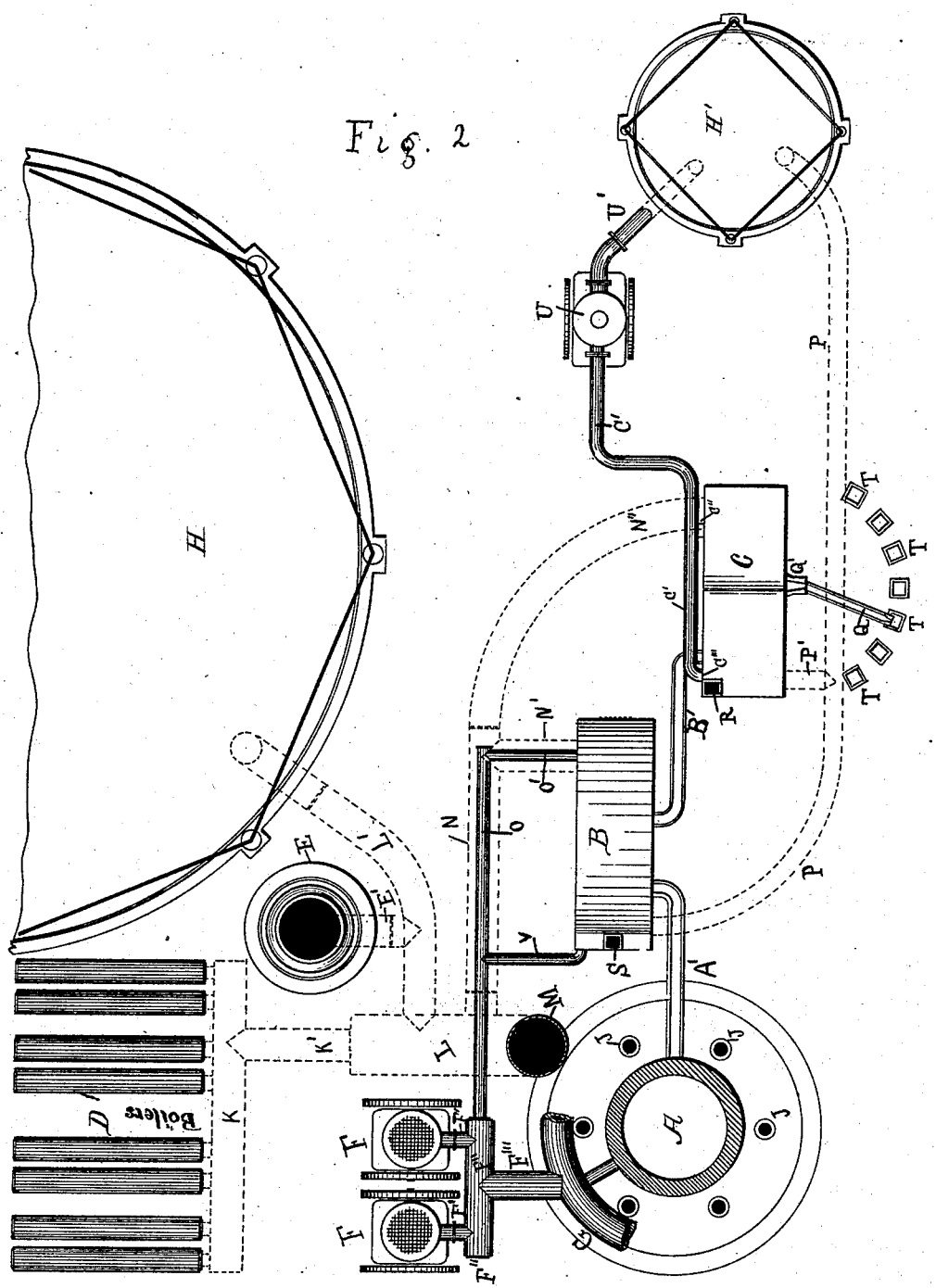

JOHN FRANCIS BENNETT, OF PITTSBURG, PENNSYLVANIA.

APPARATUS FOR THE MANUFACTURE OF INGOT IRON AND STEEL.

SPECIFICATION forming part of Letters Patent No. 294,002, dated February 26, 1884.

Application filed December 1, 1882. (No model.)

*To all whom it may concern:*

Be it known that I, JOHN FRANCIS BENNETT, a citizen of the United States, residing at Pittsburg, in the county of Allegheny and State of Pennsylvania, have invented a certain new and useful Improvement in Apparatus for the Manufacture of Ingot Iron and Steel; and I do hereby declare that the following is a full, clear, and exact description of the invention, which will enable others skilled in the art to which it appertains to make and use the same.

My invention relates to apparatus used in the production of ingot iron and steel; and the object of my improvement is to utilize a cold-air-blast furnace in connection with two reverberatory furnaces, suitable gas-holders, and means for operating the plant, whereby the liquid metal first charged as ore to the blast-furnace may, by gravity, consecutively pass through each of the reverberatory furnaces, and thus undergo, in timed gradations, the chemical changes in its constituent mass essential to its perfection for use in the arts, while at intermediate points of its passage it is subjected to purifying agencies.

I am aware that heretofore the crude metal has been run direct from the blast-furnace to a reverberatory furnace, and finally to a regenerative furnace; also, that the gases from the blast-furnace have been introduced to the metal-working chamber of a refinery-furnace for the purpose of purifying the metal; also, that inclined troughs have been provided to afford connection between two reverberatory furnaces for the passage of the metal; and these I do not claim, nor the processes herein described, as being of my invention.

In the accompanying drawings Figure 1 represents an elevation, partly in section, of the plant essential to the operation of my invention. Fig. 2 is a plan view of the same.

Similar letters refer to corresponding parts in the views.

A represents the blast-furnace, fed with cold air derived from the atmosphere through blowers F F, pipes F′ F″ F‴ G, and tuyeres I I. The furnace-gases are conducted through downcomer M and pipes L K′ K to the boilers D, to induce the generation of steam; through downcomer M and pipes L N N′, to heat the reverberatory furnace B; through downcomer M and pipes L L′ to gas-holder H, where surplus gases are stored for utility in subsequent operations, and through downcomer M and pipes L L′ E′ to the chimney E.

B represents a reverberatory furnace fed by gas from the furnace A, and having a chimney, S. It is placed on such a plane horizontally relatively to the blast-furnace A that the liquid pig-iron from the latter readily flows by gravity through trough A′ therein.

C is a regenerative furnace fed by gas from the furnace A through downcomer M and pipes L N″. It is so located relatively to the reverberatory furnace B that the liquid pig-iron from the latter flows by gravity therein through trough B′.

D represents a battery of boilers heated by gas from the furnace A through downcomer M and pipes L K′ K, which generate the steam requisite to drive the engine connected with the blower U, with which they are connected by pipes, (not shown,) and blowers F F, with which they are connected by pipes. (Not shown.)

E represents the main shaft, discharging the products of combustion of the blast-furnace A, with which it is connected by downcomer M and pipes L L′ E′.

F F represent the blowers, operated by steam derived from the boilers D by pipes (not shown) which inject atmospheric air into the blast-furnace A by pipes F′ F′ F″ F‴ G and tuyeres I I. They also force cold air into the reverberatory furnace B, to accelerate the desiliconizing of the liquid pig-iron therein by pipes F′, F′, F‴, O, and O′.

H is a gas-holder storing surplus gases for use at critical moments, derived from the blast-furnace A through downcomer M and pipes L L′.

H′ is a smaller gas-holder, receiving waste gases from the regenerative furnace C through pipes P′ P. The carbonic-acid gases from H′ are drawn through pipe U′ into the blower U by its engine, and injected alternately into the forward and rear ends of the furnace C, containing the liquid steel.

J J represent the holes in the blast-furnace, to accommodate the tuyeres I I.

M represents a downcomer or flue beginning near the top of the blast-furnace A, and terminating in the main underground flue, it conducts the waste gases to the pipe L, whence they are distributed in various directions.

P represents the pipe connecting the reverberatory furnace B with the gas-holder H', to which it conducts the waste gases from the former, consisting, chiefly, of carbonic-acid gas and nitrogen.

Q represents a trough conducting the liquid steel from the regenerative furnace C, through projections I', from said furnace to the ingot-molds T T.

R represents the shaft of the regenerative furnace C.

S represents the flue of the reverberatory furnace B, conveying products of combustion from blast-furnace A to the fire-place of furnace B.

V is a pipe to inject cold air from blowers F F into the furnace B.

Having described the relative positions of the elements constituting the plant, I now proceed to specify the functions of each, and its co-operation with the others in the results aimed at.

I charge the blast-furnace A with ore, flux, and fuel, and, igniting the fuel, I inject cold air by blowers F F. I cause the pig-iron made in the blast-furnace to run, while liquid, into the reverberatory furnace B by trough A', and detain it there until the hot gases passing over it from M N N' have desiliconized the mass. I have found in practice that time, rather than excessive heat, is required in this operation, and for this reason that a reverberatory furnace is as efficacious as desirable, and preferable to a regenerative furnace, because of the smaller cost of the former. I next cause the liquid iron from furnace B to flow into the furnace C through trough B', where, by the action of the gases passing over it through M N N'', the remnant of carbon is removed, and the iron, now soft, is ready to be tapped into the ingot-molds T T through pipes Q' Q. During the early part of the operation in the furnace B, while the silicon is being removed, it will be necessary to add lime or other flux to the liquid bath, which combines with the silica rising from the iron, and makes an easily-fusible slag, that retains in it any phosphates and sulphates that may have arisen from the iron during this part of the operation. Care must be taken to tap off at this stage, before all the silicon has been removed, the slag rising to the surface of the liquid bath; otherwise the carbon changing into carbonic-oxide gas will pass through the slag and retransform the phosphates and sulphates held in suspension into phosphorus and sulphur, which, in part, would be deposited in the liquid iron. Should there be an objectionable amount of sulphur and phosphorus in the liquid iron while in the furnace C, it can be removed by injecting carbonic-acid gas into and through the liquid iron, after the carbon has been eliminated, by tuyeres suitably located in the sides or top of the furnace, as fully described in Patent No. 75,240, granted to me March 10, 1868. Such carbonic-acid gas may contain its proportion of nitrogen, as found in atmospheric air, and it is not essential that it should be heated before injection into the liquid iron, inasmuch as the furnace is kept hot by the flames passing over it. The waste gases from furnace B will suffice for this purpose. In both of the furnaces B and C the operation may be hastened by blowing air into the liquid iron through tuyeres suitably located; but, having in view the quality of the product, I recommend that carbonic-acid gas only, with or without nitrogen, be permitted to flow over or be forced into the liquid iron toward the close, and until the end of the operation in furnace C. If the operation has been carefully conducted, nothing need be added to produce ingot-iron; to produce low steel ingots, (.02 per cent. to .15 per cent. of carbon,) a minimum of ferro-manganese; and to produce high steel ingots, (.2 per cent. to .75 per cent. of carbon,) a minimum of ferro-manganese, with "best" pig-iron sufficient to add the requisite carbon. I prefer to admit into the liquid iron only as much manganese as will eliminate the oxygen. If a high steel is required, I add the necessary carbon by means of good pig-iron, as above stated. When the operation thus described is concluded, I tap the liquid soft iron or low or high steel into the ingot-molds T T.

An essential feature of the operation is the gas-holder H, which, receiving surplus gases in the early stages of the process, constitutes an auxiliary source of supply during stoppages of the fuel in the blast-furnace A. I proportion the size of this gas-holder so that during a stoppage in the blast-furnace of three hours the supply requisite to complete the charges in the other furnaces would be furnished therefrom. I estimate that three-tenths ($\frac{3}{10}$) of the blast-furnace gases are required to supply power to inject air into the three furnaces A B C, and three-tenths ($\frac{3}{10}$) for each of the furnaces B C, leaving one-tenth ($\frac{1}{10}$) for storage in the gas-holder H for auxiliary and outside purposes.

The advantages following the use of this combination of furnaces are, that a cold-air-blast furnace both makes a good quality of pig-iron and supplies the gaseous fuel requisite for the entire operation; that a plain reverberatory furnace requires no extraordinary heat, while fully accomplishing the elimination of silicon and part of the phosphorus and sulphur from the liquid iron, and materially reduces the long time heretofore required to make steel from pig-iron in one furnace; that a regenerative furnace raised to an extraordinary temperature for one-half the time heretofore required, and receiving the liquid pig-iron after most of its impurities have been removed, is less subject to their destructive action on the fire-brick lining; and, finally, the whole operation, being continuous, offers superior facilities for producing with precision a desirable product, whether of soft iron or high or low steel.

It is obvious that a hot-air-blast furnace might be employed in combination with two consecutive reverberatory furnaces in the process herein described. In this case part of the blast-furnace gases may heat the air for the blast-furnace, a portion may be stored in the gas-holder, and the remainder utilized in the reverberatory furnaces, while the engine-boilers would be heated by independent means, or a combination of blast-furnace gases and other fuel may conjointly or separately be used for any or all of the furnaces; but I prefer to use a cold-air-blast furnace, A, whose escaping gases, assisted by those in the gas-holder H, supply heat to the boilers D and each of the furnaces B C.

Having thus fully described my invention, what I claim, and desire to secure by Letters Patent of the United States, is—

The combination, with a blast-furnace, A, of a reverberatory furnace, B, a regenerative furnace, C, connected and constructed as described, of a gas-holder, H, suitable blowers, F F, and connections, as and for the purposes herein fully set forth.

JOHN FRANCIS BENNETT.

Witnesses:
J. J. McCORMICK,
M. J. McDONALD.